United States Patent [19]

Evans et al.

[11] 4,436,799
[45] Mar. 13, 1984

[54] PHOTOGRAPHIC PRODUCTS AND PROCESSES EMPLOYING NOVEL NONDIFFUSIBLE MAGENTA DYE-RELEASING COMPOUNDS AND PRECURSORS THEREOF

[75] Inventors: Steven Evans, Rochester; James K. Elwood, Victor, both of N.Y.

[73] Assignee: Eastman Kodak Company, Rochester, N.Y.

[21] Appl. No.: 504,631

[22] Filed: Jun. 15, 1983

Related U.S. Application Data

[60] Division of Ser. No. 458,499, Jan. 17, 1983, which is a continuation-in-part of Ser. No. 380,843, May 21, 1982, abandoned.

[51] Int. Cl.$^3$ .................... G03C 1/40; C09B 45/00
[52] U.S. Cl. .............................. 430/17; 260/146 D; 260/146 R; 260/146 T; 260/147; 430/519
[58] Field of Search ............... 430/17, 519, 563, 223, 430/562; 260/146 R, 146 D, 146 T, 147

[56] References Cited

U.S. PATENT DOCUMENTS

| | | | |
|---|---|---|---|
| 2,218,231 | 10/1940 | Dickey et al. | 260/155 |
| 2,234,774 | 3/1941 | Dickey et al. | 260/155 |
| 3,377,337 | 4/1968 | Sugiyama et al. | 260/155 |
| 3,389,132 | 6/1968 | Dressler et al. | 260/146 R |
| 4,076,529 | 2/1978 | Fleckenstein et al. | 430/223 |
| 4,142,891 | 3/1979 | Baigrie et al. | 430/223 |
| 4,148,642 | 4/1979 | Chapman et al. | 430/223 |
| 4,207,104 | 6/1980 | Chapman et al. | 430/223 |
| 4,287,292 | 9/1981 | Chapman et al. | 430/223 |
| 4,357,412 | 11/1982 | Anderson et al. | 430/223 |

FOREIGN PATENT DOCUMENTS

| | | |
|---|---|---|
| 762451 | 7/1967 | Canada . |
| 1270940 | 7/1961 | France . |
| 52-106727 | of 1977 | Japan . |
| 1568855 | 6/1980 | United Kingdom . |

*Primary Examiner*—Richard L. Schilling
*Attorney, Agent, or Firm*—Harold E. Cole

[57] ABSTRACT

Photographic elements, diffusion transfer assemblages, coordination complexes and processes are described which employ a novel nondiffusible compound capable of releasing at least one diffusible magenta dye moiety comprising a 4-(2-heterocyclylazo)phenol having a heterocyclic ring fused thereto, the compound having the formula:

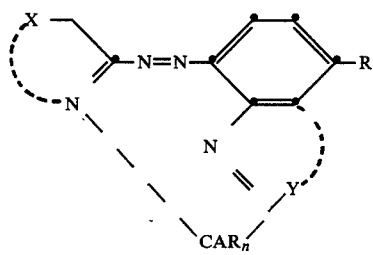

wherein:
(a) X represents the atoms necessary to complete a 5- or 6-membered heterocyclic ring;
(b) Y represents the atoms necessary to complete a 5- or 6-membered heterocyclic fused ring;
(c) CAR represents a ballasted carrier moiety capable of releasing the diffusible magenta dye moiety as a function of development of a silver halide emulsion layer under alkaline conditions;
(d) R represents a hydroxy group, a salt thereof, or a hydrolyzable precursor thereof, or CAR which is linked to the dye moiety through an oxygen atom thereon; and
(e) n is 0, 1 or 2, with the proviso that when n is 0, then R is CAR which is linked to the dye moiety through an oxygen atom thereon.

12 Claims, No Drawings

PHOTOGRAPHIC PRODUCTS AND PROCESSES EMPLOYING NOVEL NONDIFFUSIBLE MAGENTA DYE-RELEASING COMPOUNDS AND PRECURSORS THEREOF

This is a division of application Ser. No. 458,499, filed Jan. 17, 1983, which is a continuation-in-part of Ser. No. 380,843, filed May 21, 1982, now abandoned.

This invention relates to photography and more particularly to color diffusion transfer photography employing certain nondiffusible magenta dye-releasing compounds which, as a function of development of a silver halide emulsion layer, release a diffusible magenta dye. The dye-releasing compound can be premetallized or a metal complex of the released dye can be formed in an image-receiving layer.

U.S. Pat. No. 4,148,642 of Chapman et al discloses nondiffusible compounds having a releasable cyan 1-arylazo-4-isoquinolinol dye moiety. The compounds of our invention, however, are magenta and comprise different heterocyclic moieties attached to an azo linkage than those of Chapman et al.

Various metallizable magenta dyes are described in U.S. Pat. No. 4,207,104 of Chapman et al (pyridylazonaphthols), U.S. Pat. No. 4,287,292 of Chapman et al (o-carboxyarylazopyridinediols) and U.S. patent application Ser. No. 282,613, filed July 13, 1981, of Anderson et al [2-(pyridylazo)-5-(N-alkylanilino)phenols]. The magenta dye-releasing compounds of our invention, however, have narrower band widths and less unwanted absorption than these prior art metallizable dyes as will be shown by comparative tests hereinafter.

U.S. Pat. Nos. 2,218,231 and 2,234,724 relate to textile dyes comprising azo compounds having a quinoline moiety. U.S. Pat. Nos. 3,389,132 and 3,377,337 and French Pat. No. 1,270,940 relate to metal complexes of azo dyes having a quinoline moiety, also used as textile dyes. There is no disclosure in those patents, however, that the quinoline moiety may be linked through an azo linkage to a heterocyclic moiety, as described herein. In addition, there is no disclosure in those references that carrier moieties could be attached to those compounds, or that they could be premetallized or that they could be used in photographic elements.

Canadian Pat. No. 762,451 relates to metallizable textile dyes comprising compounds having a quinoline moiety linked through an azo linkage to a heterocyclic moiety. There is no disclosure in this patent, however, that a carrier moiety could be attached to those compounds to be used as dye-releasers in photographic elements, or that they could be premetallized or that quinolinol moieties could be employed, as described herein.

In U.S. Pat. No. 4,076,529 issued Feb. 28, 1978, nondiffusible dye releasing compounds are disclosed. Among the various dye moieties disclosed which can be released are "metal complexed dyes". No specific structures are shown, however.

A premetallized azo dye attached to a ballasted carrier moiety which releases the dye as a function of development is disclosed in Japanese Publication No. 106727/1977. The specific compounds of our invention are not disclosed, however.

U.S. Pat. No. 4,142,891 of Baigrie et al relates to various nondiffusible azo dye-releasing compounds having a releasable azo dye moiety. When the dye moiety is released, it diffuses to an image-receiving layer where it is then contacted with metal ions to form a stable metal complex. These dye-releasing compounds are described as being metallizable, i.e., they are capable of forming a metal complex at some step in the process. In column 1, lines 40–45 of that patent, reference is made to the April 1977 edition of Research Disclosure, pages 32–39, which discloses "premetallized dyes" which "are large molecules which diffuse more slowly than unmetallized dyes, resulting in long access times for image formations." The specific compounds of our invention are not disclosed, however.

It would be desirable to provide improved magenta dye-releasing compounds containing chelating dye moieties, so that the dye which is released imagewise during processing, which can be premetallized or metallizable, can diffuse to an image-receiving layer to form a metal-complexed, dye transfer image having better hues, minimum unwanted absorption outside the green region of the spectrum, narrower bandwidths, rapid diffusion rates and shorter access times than those of the prior art, as well as good stability to heat, light and chemical reagents.

A photographic element in accordance with one embodiment of the invention comprises a support having thereon at least one photosensitive silver halide emulsion layer having associated therewith a dye image-providing material comprising a nondiffusible compound capable of releasing at least one diffusible magenta dye moiety comprising an 8-(2-heterocyclylazo)-5-quinolinol, the compound containing:

(a) in the heterocyclyl moiety a nitrogen atom which is adjacent to the point of attachment to the azo linkage; and (b) a ballasted carrier moiety which is capable of releasing the diffusible azo dye under alkaline conditions.

In a preferred embodiment of our invention, our nondiffusible compounds are capable of releasing at least one diffusible magenta dye moiety comprising a 4-(2-heterocyclylazo)phenol having a heterocyclic ring fused thereto, the compounds having the following formula:

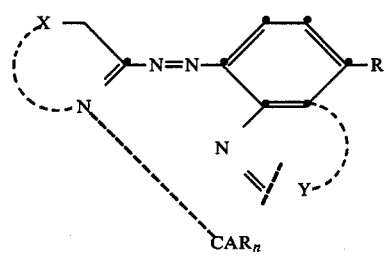

wherein:

(a) X represents the atoms necessary to complete a 5- or 6-membered heterocyclic ring such as pyridine, imidazole, pyrazole, oxazole, thiazole, or thiazoline;

(b) Y represents the atoms necessary to complete a 5- or 6-membered heterocyclic fused ring such as quinoline, quinoxaline, benzimidazole, or indolenine;

(c) CAR represents a ballasted carrier moiety capable of releasing the diffusible magenta dye moiety as a function of development of the silver halide emulsion layer under alkaline conditions;

(d) R represents a hydroxy group, a salt thereof, or a hydrolyzable precursor thereof, or CAR which is linked to the dye moiety through an oxygen atom thereon; and (e) n is 0, 1 or 2, with the proviso that when n is 0, then R is CAR which is linked to the dye moiety through an oxygen atom thereon.

In a preferred embodiment of our invention, R is hydroxy, X represents the atoms necessary to complete a pyridine, imidazole or pyrazole ring and Y represents the atoms necessary to complete a quinoline, quinoxaline or benzimidazole ring. In another preferred embodiment of our invention, R is hydroxy, X represents the atoms necessary to complete a pyridine ring, Y represents the atoms necessary to complete a quinoline ring, n is 1 and CAR is attached to the pyridine ring.

As stated above, R can be a hydroxy group, a salt thereof such as a sodium salt, a tetramethylammonium salt, etc., or a hydrolyzable precursor thereof, or CAR as defined below. Hydrolyzable precursors of a hydroxy group which can be employed in our invention include acetate, benzoate, pivalate, carbamates, an acyloxy group having the formula —$OCOR_1$, —$OCOOR_1$ or —$OCON(R_1)_2$, wherein each $R_1$ is an alkyl group having 1 to about 8 carbon atoms, such as methyl, ethyl, isopropyl, butyl and the like, or an aryl group having 6 to about 12 carbon atoms, such as phenyl, etc., or any of the blocking groups which can be cleaved by an intramolecular nucleophilic displacement reaction, as disclosed in Mooberry and Archie U.S. Pat. No. 4,310,612, the disclosure of which is hereby incorporated by reference.

When R is CAR as defined below or a hydrolyzable precursor of a hydroxy group, the absorption of the dye-releasing compound is shifted out of the green region of the spectrum, so that the compound may be incorporated in the emulsion layer, which is very desirable in certain embodiments of the invention.

In another embodiment of the invention, CAR may have attached thereto two azo dye moieties in which case two dye moieties will be released from one CAR moiety.

Other substituents may also be present in the two rings illustrated above, such as alkyl of 1 to 6 carbon atoms, acyl, aryl of 6 to 10 carbon atoms, aralkyl, alkylsulfonyl, amino, alkoxy, halogens such as chloro or bromo, morpholino, phenylsulfamoyl, solubilizing groups such as sulfonamido, sulfamoyl, carboxy, sulfo or hydrolyzable precursors thereof.

In another preferred embodiment of our invention, the dye image-providing materials described above may be premetallized, i.e., they would comprise a coordination complex of the nondiffusible compounds described above and a polyvalent metal ion. In yet another preferred embodiment of the invention, the coordination complex comprises a 2:1 complex of the nondiffusible compound and a divalent or trivalent hexacoordinate metal ion. Such metal ions include, for example, zinc(II), nickel(II), copper(II), cobalt(II) and cobalt(III) ions. Especially good results are obtained with nickel(II) ions.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); British Patent Publication No. 2,017,950A (dye released by a dye bleach process); U.S. Pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Pat. No. 1,464,104; *Research Disclosure* 14447, April 1976; U.S. Pat. No. 4,139,379 of Chasman et al, U.S. Pat. No. 4,232,107 and European Patent Publication No. 12908 (dye released by miscellaneous mechanisms), the disclosures of which are hereby incorporated by reference.

When R is CAR, it must be one which is linked to the dye moiety through an oxygen atom thereon, so that a phenol having a heterocyclic ring fused thereto is released from the nondiffusible compound under alkaline conditions. Such CARs are disclosed, for example, in U.S. Pat. No. 4,139,379, discussed above.

In a further preferred embodiment of the invention, the ballasted carrier moiety or CAR as described above may be represented by the following formula:

(Ballast-Carrier-Link)- wherein (a) Ballast is an organic ballasting radical of such molecular size and configuration as to render said compound nondiffusible in said photographic element during development in an alkaline processing composition;

(b) Carrier is an oxidizable acyclic, carbocyclic or heterocyclic moiety (see *The Theory of the Photographic Process*, by C. E. K. Mees and T. H. James, Third Edition, 1966, pages 282 to 283), e.g., moieties containing atoms according to the following configuration:

$a(-C=C)_b-$ wherein:
b is a positive integer of 1 to 2; and
a represents the radicals OH, SH, NH— or hydrolyzable precursors thereof; and (c) Link represents a group which, upon oxidation of said Carrier moiety, is capable of being hydrolytically cleaved to release the diffusible azo dye. For example, Link may be the following groups:

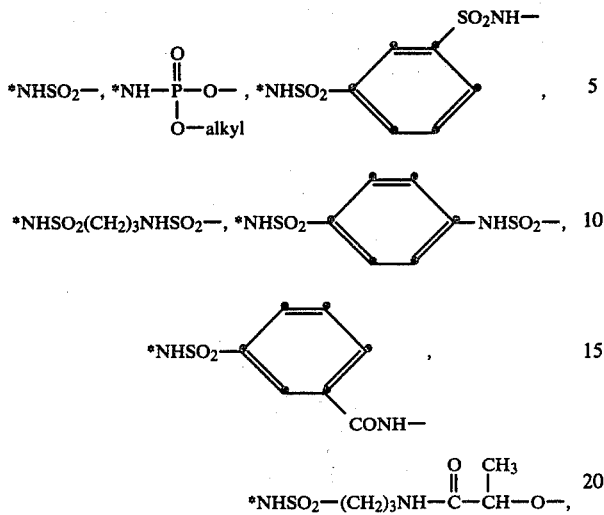

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms; a carbamoyl radical having 8 to 30 carbon atoms, such as —CONH(CH$_2$)$_4$—O—C$_6$H$_3$(C$_5$H$_{11}$)$_2$ or —CON(C$_{12}$H$_{25}$)$_2$; or a keto radical having 8 to 30 carbon atoms, such as —CO—C$_{17}$H$_{35}$ or —CO—C$_6$H$_4$(t—C$_{12}$H$_{25}$).

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formula is a group having the formula:

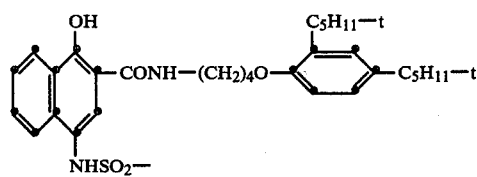

wherein:
(a) Ballast is an organic ballasting radical of such molecular size and configuration (e.g., simple organic groups or polymeric groups) as to render said compound nondiffusible in a photographic element during development in an alkaline processing composition;
(b) D is OR$^1$ or NHR$^2$ wherein R$^1$ is hydrogen or a hydrolyzable moiety, such as acetyl, mono-, di- or trichloroacetyl radicals, perfluoroacyl, pyruvyl, alkoxyacyl, nitrobenzoyl, cyanobenzoyl, sulfonyl or sulfinyl, and R$^2$ is hydrogen or a substituted or unsubstituted alkyl group of 1 to 22 carbon atoms, such as methyl, ethyl, hydroxyethyl, propyl, butyl, secondary butyl, terbutyl, cyclopropyl, 4-chlorobutyl, cyclobutyl, 4-nitroamyl, hexyl, cyclohexyl, octyl, decyl, octadecyl, dodecyl, benzyl or phenethyl (when R$^2$ is an alkyl group of greater than 8 carbon atoms, it can serve as a partial or sole Ballast);
(c) Z represents at least the atoms necessary to complete a benzene nucleus, a naphthalene nucleus, or a 5 to 7 membered heterocyclic ring, such as pyrazolone or pyrimidine; and
(d) j is a positive integer of 1 to 2 and is 2 when D is OR$^1$ or when R$^2$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

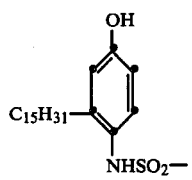

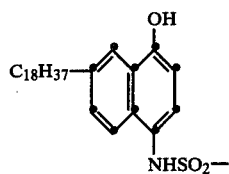

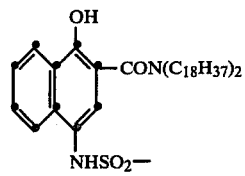

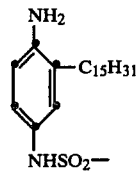

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

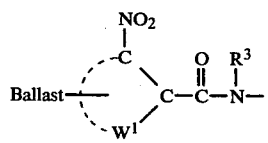

(I)

wherein:
Ballast is an organic ballasting radical of such molecular size and configuration as to render said compound nondiffusible in a photographic element during development in an alkaline processing composition;
$W^1$ represents at least the atoms necessary to complete a benzene nucleus (including various substituents thereon); and
$R^3$ is an alkyl (including substituted alkyl) radical having 1 to about 4 carbon atoms.

Examples of the CAR moiety in this formula (I) include the followng:

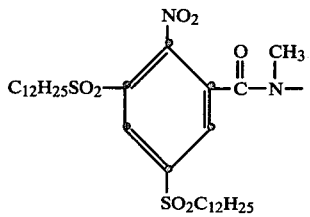

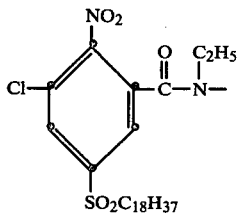

In a second embodiment of positive-working dye-release chemistry as referred to above, the ballasted carrier moiety or CAR in the above formulas may be a group having the formula:

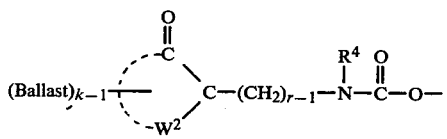

(II)

wherein:
Ballast is an organic ballasting radical of such molecular size and configuration as to render said compound nondiffusible in a photographic element during development in an alkaline processing composition;
$W^2$ represents at least the atoms necessary to complete a quinone nucleus (including various substituents thereon);
r is a positive integer of 1 or 2;
$R^4$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^4$ is a radical of less than 8 carbon atoms.

Examples of the CAR moiety in this formula (II) include the following:

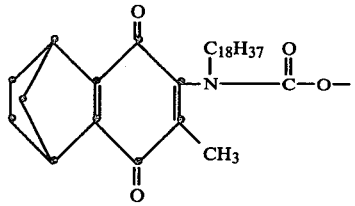

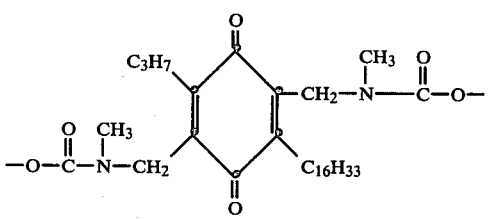

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

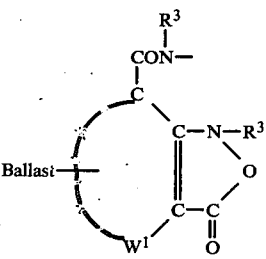

(III)

wherein: Ballast, $W^1$ and $R^3$ are as defined for formula (I) above.

Examples of the CAR moiety in this formula (III) include the following:

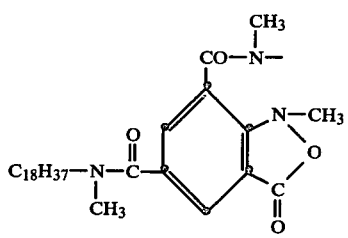

-continued

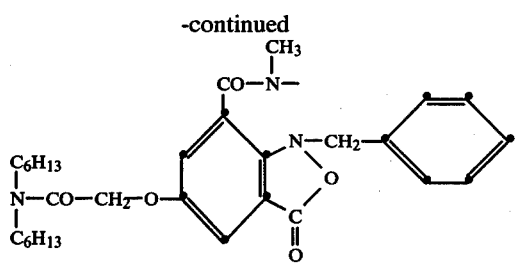

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

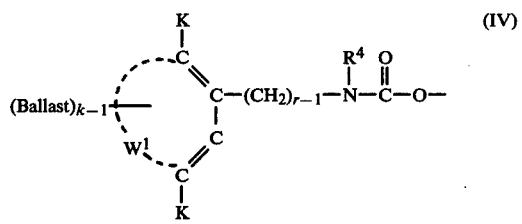 (IV)

wherein:

Ballast, r, $R^4$ and k are as defined for formula (II) above;
$W^1$ is as defined for formula (I) above; and
K is OH or a hydrolyzable precursor thereof.
Examples of the CAR moiety in this formula (IV) include the following:

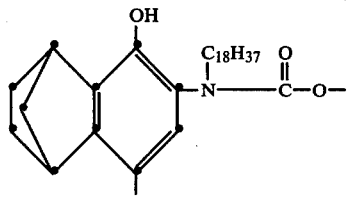

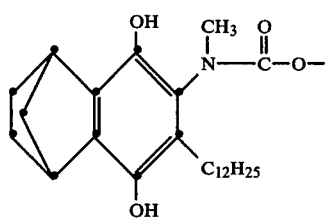

For further details concerning this particular CAR moiety, including synthesis details, reference is made to U.S. Pat. No. 3,980,479 of Fields et al, the disclosure of which is hereby incorporated by reference.

Representative compounds included within the scope of the invention include the following:

Metallizable Compounds

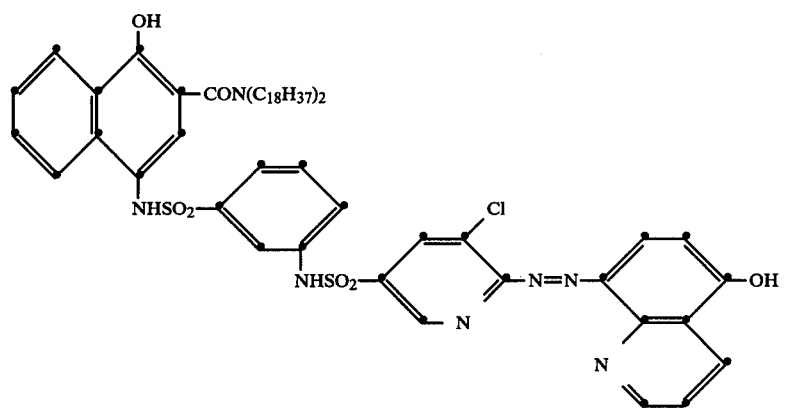
(1)

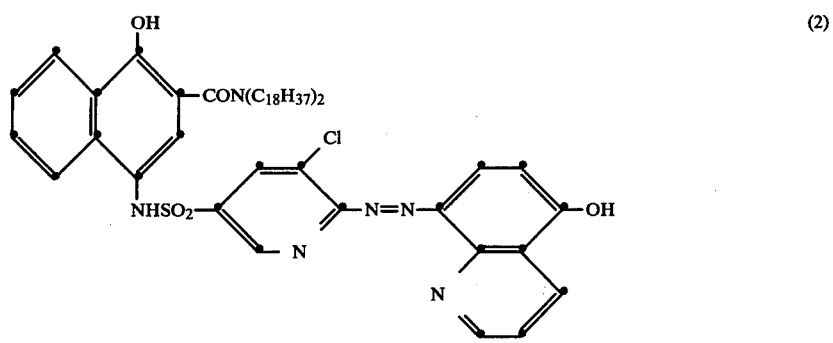
(2)

Compounds 3–6

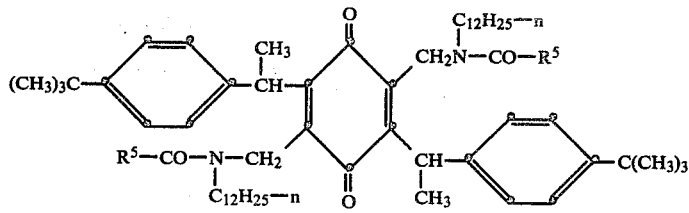
wherein:
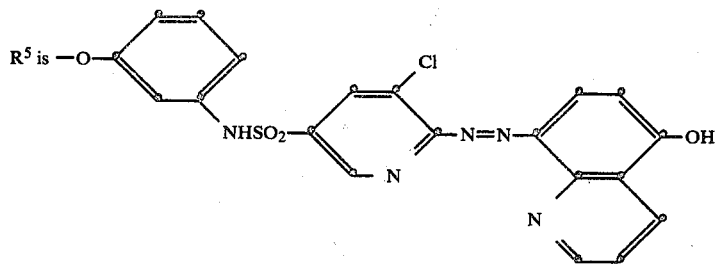
(3)
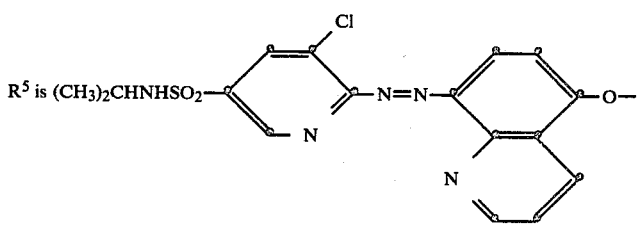
(4)
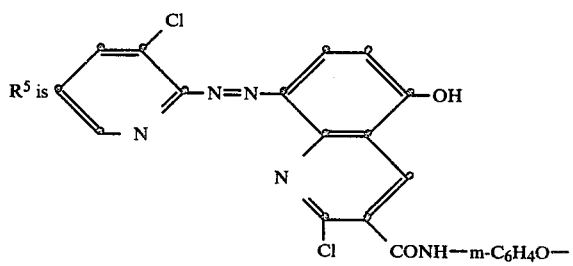
(5)
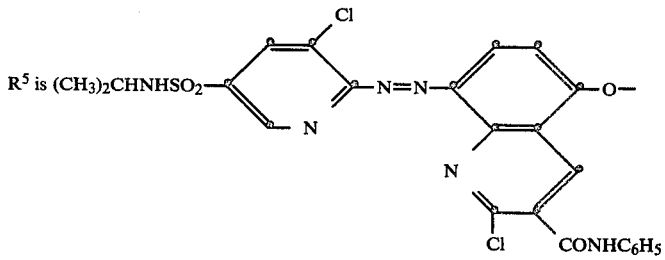
(6)
Compounds 7-9
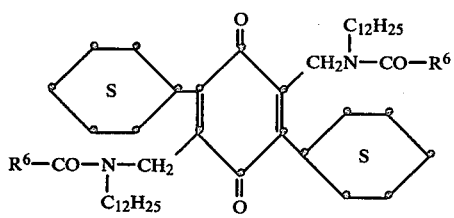
wherein:

-continued
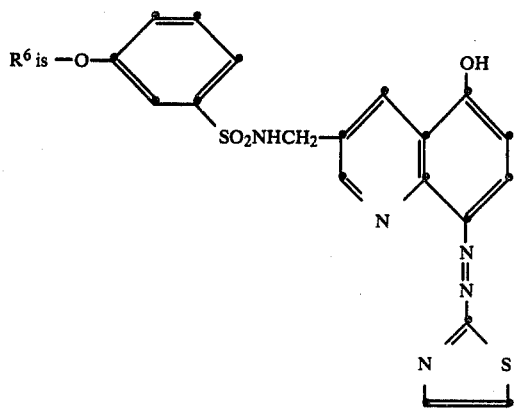
(7)
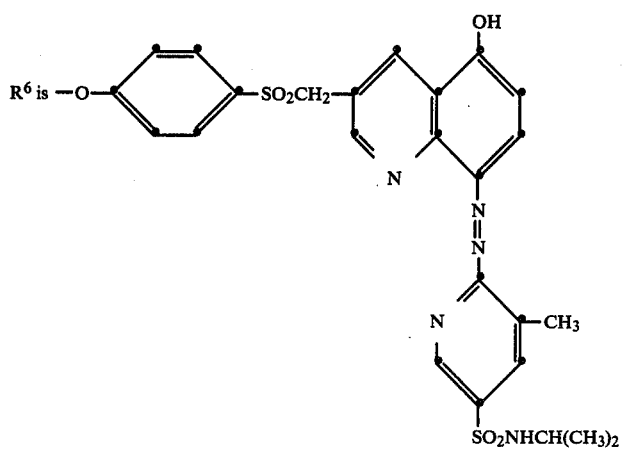
(8)
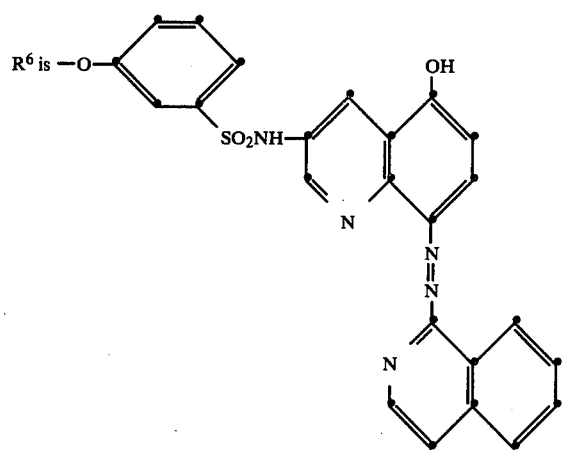
(9)
Compound 10

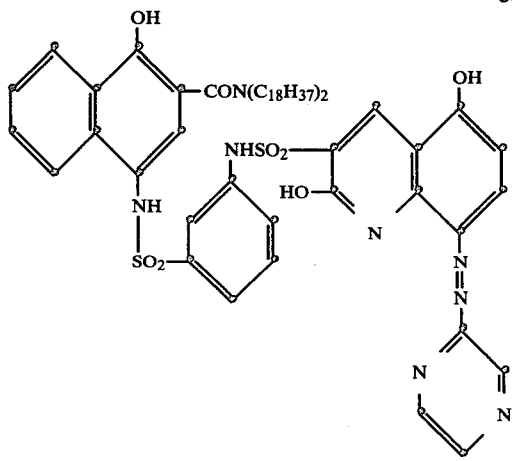
Compound 11
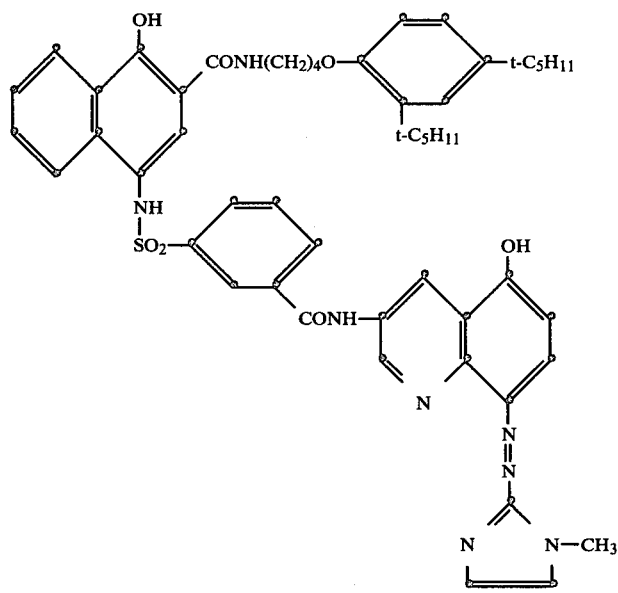
Compounds 12-13
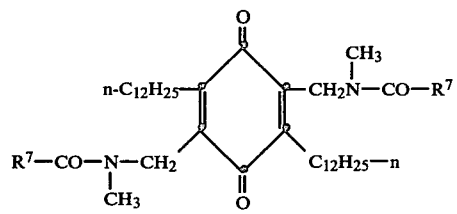
wherein:
R[7] is
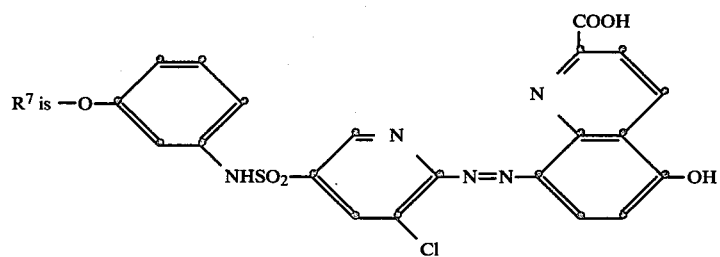
(12)

R[7] is
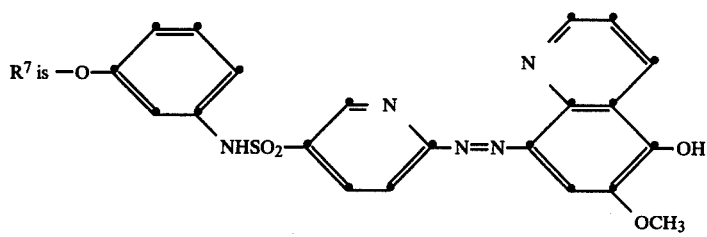
(13)
Premetallized Compounds
Compounds 14–20
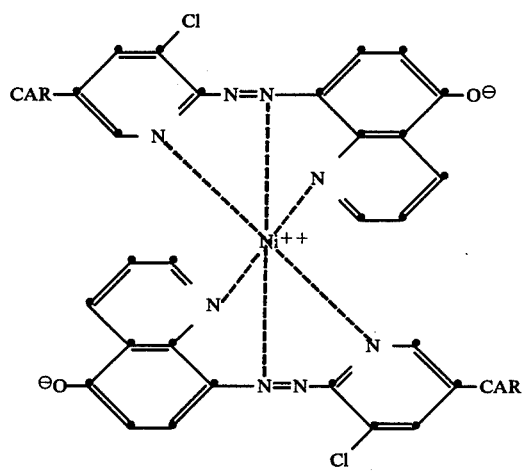
(14)
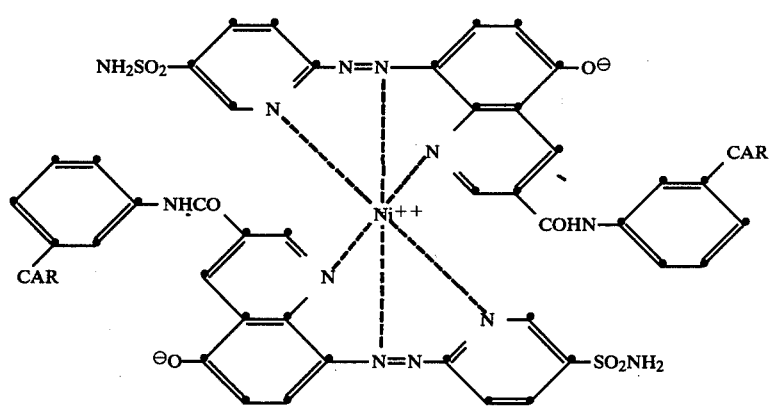
(15)
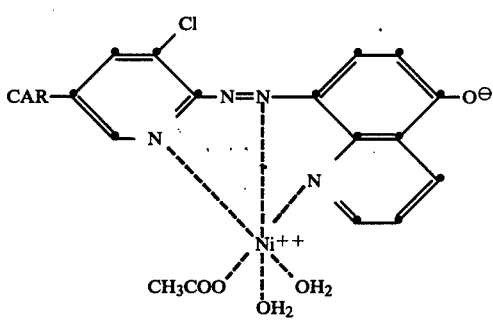
(16)

-continued
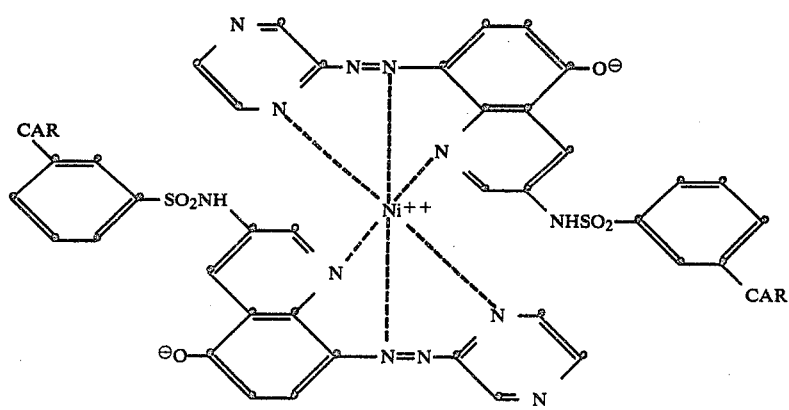
(17)
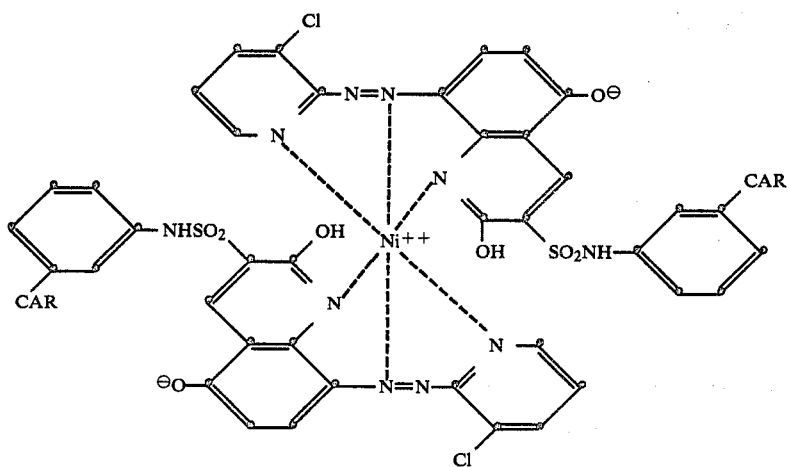
(18)
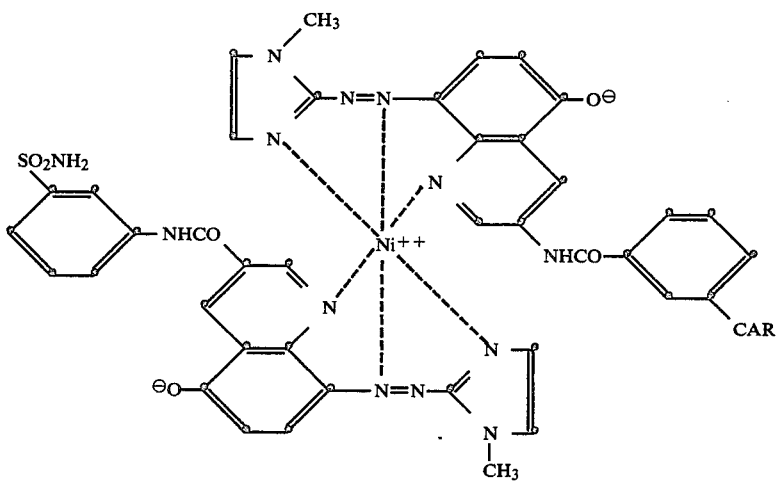
(19)

-continued
(20)
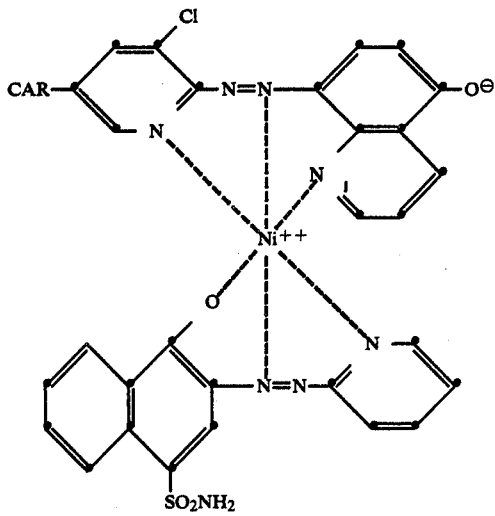
wherein
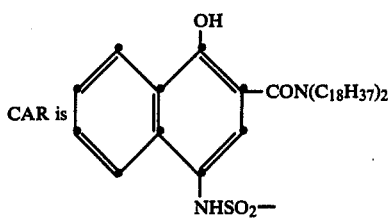
CAR is
Compounds 21-22
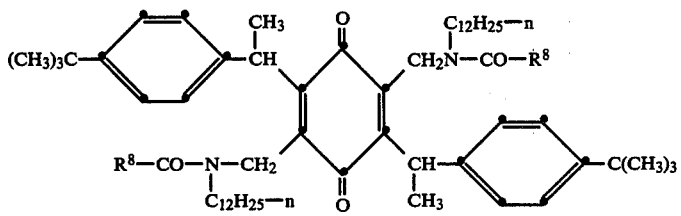
wherein
R[8] is NH$_2$SO$_2$—
(21)
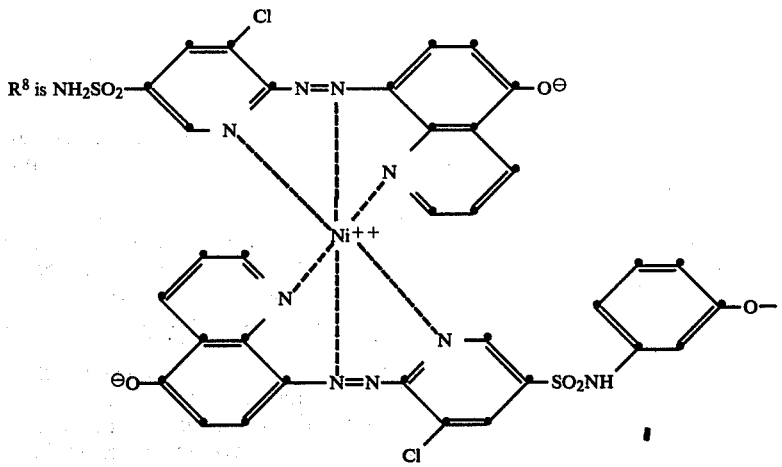
wherein -continued R⁸ is NH₂SO₂— 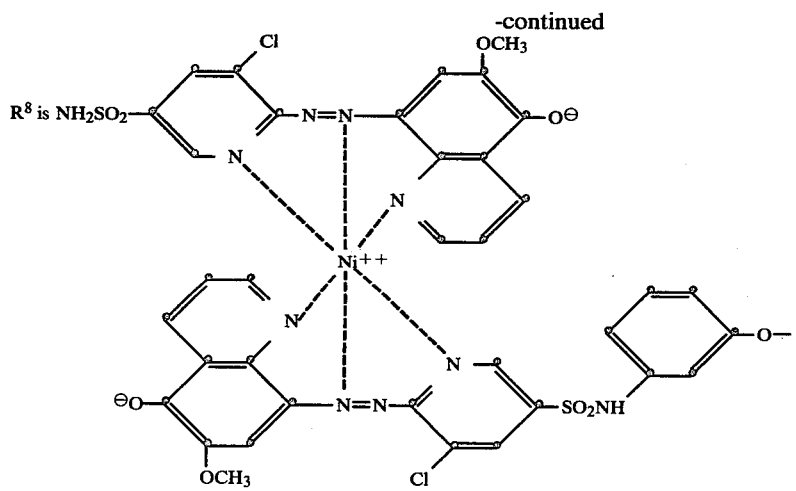

(22)

Compound 23

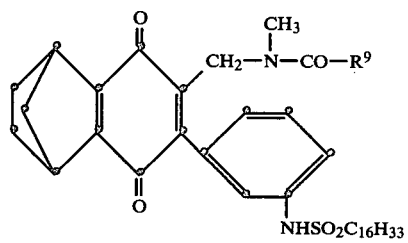

wherein

R⁹ is (CH₃)₂CHNHSO₂— 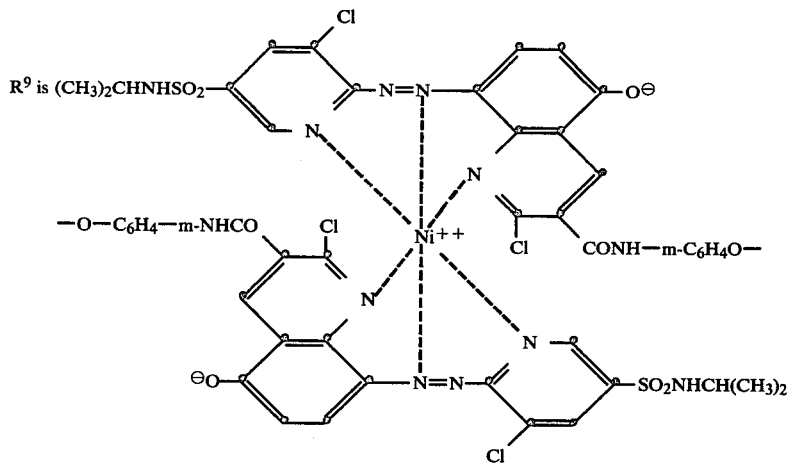

A process for producing a photographic transfer image in color according to the invention comprises:
(a) treating an imagewise-exposed photographic element as described above having a metallizable dye-releasing compound with an alkaline processing composition in the presence of a silver halide developing agent to effect development of each of the exposed silver halide emulsion layers;
(b) the dye-releasing compound then releasing the diffusible azo dye as described above imagewise as a function of the development of each of the silver halide emulsion layers;
(c) at least a portion of the imagewise distribution of the azo dye diffusing to a dye image-receiving layer; and
(d) contacting the imagewise distribution of azo dye with metal ions, thereby forming a metal-complexed azo dye transfer image.

The magenta azo dye moiety which is released from the metallizable dye-releasing compounds described above is a tridentate ligand and will form a coordination complex in the image-receiving layer with polyvalent metal ions. The metal ions can be present in the image-receiving layer itself or in a layer adjacent thereto, or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II), cobalt (II) and cobalt (III) ions.

For example, it is believed that the coordination complex which is formed from the tridentate, metallizable azo dye ligand according to the invention in one of the preferred embodiments thereof has the following structure:

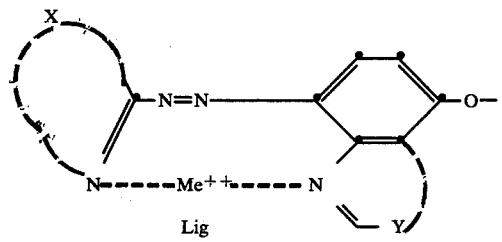

wherein:
X and Y are as defined above;
Me is metal; and
Lig is one or more ligand groups, depending upon the coordination number of the metal ion, such as H₂O, Cl or pyridine, a second dye moiety or a part of a polymer. (A divalent metal ion in solution always has a number of ligand groups attached to it depending upon its coordination number and the relative reactivity of various ligand groups such as water, ammonia, chloride, pyridine or acetate, which may be in the solution environment of the metal ion. These ligands can be displaced by a tridentate azo dye ligand which would form a more stable complex.)

Thus, in accordance with this preferred embodiment of the invention, a photographic element is provided which comprises a support having thereon a coordination complex of a polyvalent metal ion and a compound having the formula:

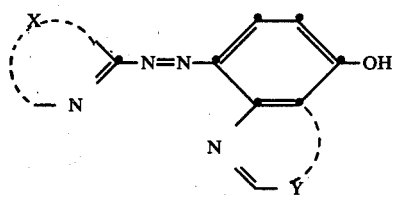

wherein: X and Y are as described previously.

The element usually contains a photographic mordant or image-receiving layer to bind the dye or coordination complex thereto.

The structures shown above may also, of course, be substituted in the same manner as described above for the starting compounds from which they are released.

It will be appreciated that, after processing the photographic element described above, there remains in it after transfer has taken place an imagewise distribution of azo dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element in the above-described process can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:
(1) a photographic element as described above; and
(2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition in a film assemblage which can be used in our invention is the liquid spreading means described in U.S. Application Ser. No. 143,230 of Columbus, filed Apr. 24, 1980.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

In the embodiment described above, the dye image-receiving layer may itself contain metal ions or the metal ions may be present in an adjacent layer, so that the tridentate, metallizable azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., TiO$_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye-releasing compound as described above. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have the magenta or magenta-forming dye-releaser of the invention associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers at a concentration of about 0.1 to about 3 g/m$^2$ by using coating solutions containing between about 0.5 and about 8 percent by weight of the dye-releaser distributed in a hydrophilic film-forming natural material or synthetic polymer, such as gelatin, polyvinyl alcohol, etc., which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,-N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethylphenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrzolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dye imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid-and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

The alkaline solution-permeable, substantially opaque, light-reflective layer employed in certain embodiments of photographic film units used in this invention is described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure*, Volume 176, December 1978, Item No. 17643, pages 22 and 23, "Emulsion preparation and types"; they are usually chemically and spectrally sensitized as described on page 23, "Chemical sensitization", and "Spectral sensitization aand desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coatings aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Released Dyes-Spectra, Light Stability and Dye Diffusion Tests

A receiving element was prepared comprising a poly(ethylene terephthalate) film support having thereon a nickel sulfate hexahydrate (0.58 g/m$^2$)/gelatin (1.08 g/m$^2$) metal complexing layer, and a poly(4-vinylpyridine)/gelatin mordant layer (each at 2.15 g/m$^2$).

An alternative receiving element was used with the premetallized dye-complexes. It comprised a poly(ethylene terephthalate) film support having thereon a layer of gelatin (1.1 g/m$^2$) and a mordant layer of poly(styrene-co-1-vinylimidazole-co-3-benzyl-1-vinylimidazolium chloride (50:40:10) (4.5 g/m$^2$) and gelatin (2.2 g/m$^2$).

The appropriate receiving element was immersed in an alkaline solution of the azo dyes listed in Table I below. The receiver was removed from the dye solution, washed in distilled water, placed in a pH 7.0 buffer solution and dried. Transmission spectra obtained on each sample of the mordanted dyes were normalized by computer to a density of 1.0. The characteristic wavelength of the dye, $\lambda_{\frac{1}{2}}$ in nm, is the mean of the wavelength limits of the absorption envelope at half the maximum density. The HBW ("half band width") in nm is the range or distance between those limits. The dye solution spectrum in 3:1 dioxane:water at pH 7 in the presence of excess nickel ion is also given.

The above receiving elements at pH 7 were then subjected to 10 days irradiation by a high intensity daylight (HID), 6000 W Xenon arc lamp, the sample receiving 50,000 lux through a Wratten 2B (ultraviolet) filter at approximately 38° C. and low humidity. The percent fade represents the loss in density at $\lambda_{max}$ after irradiation.

Dye Diffusion Tests

The released dyes in Table I were also subjected to the conditions of two different dye diffusion tests. One, the "solution test" involved dissolving the dye in a viscous composition and transferring it through a receiving element which contains an opaque and reflecting layer in addition to the mordant layer. The other, a "gel pad test" involved imbibing the dye from solution into a thick gelatin layer, and then transferring it by direct lamination to the same receiving element which had been preswollen by soaking 5 minutes in a solution of 0.1 potassium hydroxide. The receiver for these tests had the following composition (coverages are parenthetically given in g/m²):

A transparent poly(ethylene terephthalate) film support coated with
(1) a mordant layer of poly(styrene-co-N-vinylbenzyl-N-benzyl-N,N-dimethylammonium chloride-co-divinylbenzene) (2.28) and gelatin (2.28);
(2) an opaque and reflecting layer of carbon black (1.88) in gelatin (1.23) and titanium dioxide (16.1) in gelatin (2.63); and
(3) an overcoat layer of gelatin (4.3).

Solution Test

Approximately 0.075 mmol of the unmetallized released dye was dissolved in 10 ml of 0.125 N potassium hydroxide. After the dye was completely dissolved, 20 ml of a viscous composition was added; and the resulting solution, stirred for at least 20 minutes, was 0.0025 M in dye at a pH of 13.4. The viscous composition was prepared from 46.2 g potassium hydroxide and 54 g carboxymethylcellulose dissolved in 1200 ml water. The dye solution was then spread between the receiver and a clear polyester cover sheet between spaced rollers so that the gap containing the viscous solution had a thickness of 102 μm. Measurement of the rate of dye diffusion was commenced at the point at which half of the laminate had passed through the rollers. The appearance of dye on the mordant was measured at $\lambda_{max}$ as diffuse reflection density vs. time. The reflection density was converted to transmission density by computer with the aid of a mathematical relation derived from a previous calibration. A plot of transmission density, which is proportional to concentration vs. time, was derived; and the value of t-½ of dye transfer, the time in seconds required to obtain one-half of the maximum transmission density, calculated.

Gel Pad Test

A donor element, containing a thick pad of deionized acid-processed gelatin (26 g/m²) hardened with 2 percent bis(vinylsulfonylmethyl)ether, was imbibed with a solution of 0.1 M in potassium hydroxide and $1.3 \times 10^{-3}$ M in dye. The pad was soaked to full penetration, surface wiped, and then laminated in direct contact to the above receiving element which had been presoaked for 5 minutes at 0.1 M KOH. The t-½ of dye transfer was obtained as in the solution test. The diffusion times by the "gel pad test" are substantially longer than by the "solution test". The results obtained are shown in Table I.

For comparison, the 2:1 nickel complex of 2-(2-pyridylazo-4-sulfamoyl-1-naphthol, the chromophore of which is described in U.S. Pat. No. 4,207,104, has solution and gel pad dye diffusion t-½ values of 49 and 281 sec., respectively. The 2:1 nickel complex of 2-(5-sulfamoyl-2-pyridylazo)-5-(N-methylanilino)phenol, the chromophore of which is described in Anderson et al U.S. Ser. No. 282,613, filed July 13, 1981, has solution and gel pad dye diffusion t-½ values of 45 and 265 sec., respectively. The dyes of the invention thus have fast diffusion times, especially in comparison to these two dyes of the prior art.

TABLE I

Released Dyes

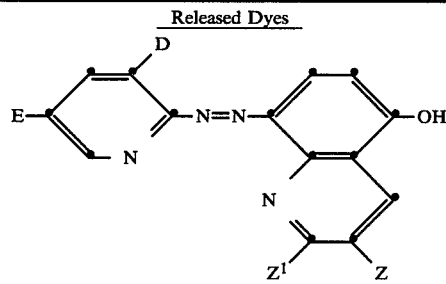

| | | | | | Spectra of Ni-Dye Complexes | | | | | Dye Diffusion $t_{\frac{1}{2}}$ (sec) | |
| | | | | | Dye Solution | | Mordant | | | | |
| Cmpd. | D | E | $Z^1$ | Z | $\lambda_{\frac{1}{2}}$ (nm) | HBW (nm) | $\lambda_{\frac{1}{2}}$ (nm) | HBW (nm) | % Fade | Soln. | Gel Pad |
|---|---|---|---|---|---|---|---|---|---|---|---|
| A | Cl | SO$_2$NH—m-C$_6$H$_4$SO$_2$NH$_2$ | H | H | 548 | 70 | 553 | 76 | 2 | 41 | 183 |
| *A' | Cl | SO$_2$NH—m-C$_6$H$_4$SO$_2$NH$_2$ | H | H | 545 | 68 | 555 | 85 | 3 | — | 235 |
| B | Cl | SO$_2$NH$_2$ | H | H | 543 | 65 | 545 | 67 | 0 | 31 | 108 |
| *B' | Cl | SO$_2$NH$_2$ | H | H | 544 | 68 | 546 | 71 | 4 | — | 161 |
| C | OCH$_3$ | SO$_2$NH—t-C$_4$H$_9$ | H | H | 560 | 79 | 563 | 82 | — | 37 | — |

TABLE I-continued

Released Dyes

[Structure: E—[pyridine ring with D]—N=N—[phenyl]—[phenyl-OH with N-containing ring bearing Z¹ and Z substituents]]

| Cmpd. | D | E | $Z^1$ | Z | Spectra of Ni-Dye Complexes | | | | | Dye Diffusion $t_{\frac{1}{2}}$ (sec) | |
|---|---|---|---|---|---|---|---|---|---|---|---|
| | | | | | Dye Solution | | Mordant | | | | |
| | | | | | $\lambda_{\frac{1}{2}}$ (nm) | HBW (nm) | $\lambda_{\frac{1}{2}}$ (nm) | HBW (nm) | % Fade | Soln. | Gel Pad |
| D | Cl | $SO_2NH$—$CH(CH_3)_2$ | H | H | 543 | 68 | 547 | 66 | — | 44 | — |
| E | Cl | $SO_2NH$—m-$C_6H_4$—OH | H | H | 544 | 65 | 550 | 70 | 1 | 39 | — |
| F | Cl | $SO_2N(CH_3)$—m-$C_6H_4OH$ | H | H | 543 | 68 | 546 | 66 | 0 | 69 | — |
| G | Cl | $SO_2NHC_6H_5$ | H | H | 542 | 65 | 548 | 70 | 0 | 81 | — |
| H | Cl | $SO_2NHCH(CH_3)_2$ | Cl | CONH—m-$C_6H_4$—OH | 548 | 63 | 549 | 72 | 7 | 49 | — |
| I | Cl | $SO_2NH_2$ | Cl | CONH—m-$C_6H_4$—OH | 545 | 62 | 550 | 70 | 4 | 57 | — |
| J | $OCH_3$ | $SO_2NH$—m-$C_6H_4$—OH | H | H | 559 | 78 | 568 | 87 | 0 | 40 | — |

*premetallized compound, alternative receiving element

EXAMPLE 2

Comparative Spectra

Example 1 was repeated to obtain spectrophotometric data on mordanted strips for the following:

(a) a 2:1 nickel complex of 2-(2-pyridylazo)-4-sulfamoyl-1-naphthol, the chromophore of which is described in Dye 26 of U.S. Pat. No. 4,207,104 of Chapman et al (Control Dye 1);

(b) a 2:1 nickel complex of 2-(5-sulfamoyl-2-pyridylazo)-5-(N-methylanilino)phenol, the chromophore of which is described in Compound D of U.S. Application Ser. No. 282,613 of Anderson et al (Control Dye 2);

(c) a 2:1 nickel complex of 6-(2-carboxy-4-chlorphenylazo)-2,3-pyridinediol, the chromophore of which is described in Compound 23 of U.S. Pat. No. 4,287,292 of Chapman et al (Control Dye 3); and (d) a 2:1 nickel complex of Compound C.

The absorption envelope of each of the metallized dyes is described by (1) the wavelength(s), $\lambda_{max}$, at the actual $D_{max}$, (2) the $\lambda_{\frac{1}{2}}$ which is the mean of the wavelength limits of the absorption envelope at half the maximum density, and (3) the halfband width (HBW) which is the band width at half the $D_{max}$. A narrow HBW generally designates a purer hue. The following results were obtained.

TABLE II

| | $\lambda_{max}$ (nm) | $\lambda_{\frac{1}{2}}$ (nm) | HBW (nm) |
|---|---|---|---|
| Control Dye 1 | 553, 567 | 537 | 101 |
| Control Dye 2 | 540, 572 | 540 | 116 |
| Control Dye 3 | 555 | 545 | 86 |
| Compound C | 560 | 545 | 67 |

The above results indicate that the metal dye complex of the invention has a substantially narrower band width and less unwanted absorption than any of the prior art metallized dyes. It will therefore provide a more accurate color reproduction than the broader absorbing metallized dyes of the prior art.

EXAMPLE 3

Synthesis of Compound 3

To a solution of 5.5 g (12.1 mmol) Compound E in 200 ml tetrahydrofuran, 100 ml pyridine and 4.8 g (37.2 mmol) N,N-diisopropylethylamine was added 3.0 g (3.17 mmol) 3,6-bis(1-p-t-butylphenylethyl)-2,5-bis(N-n-dodecylchloroformamidomethyl)benzoquinone (see U.S. Pat. No. 4,204,870, Col. 31). After stirring for 1 hour, an additional 2.5 g (2.64 mmol) of the acid chloride is added and the reaction stirred 28 hours at room temperature. The crude reaction mixture was concentrated to ca. 100 ml in vacuo at 40° C. and the residue was partitioned between ethyl acetate and 3 N HCl. The layers were separated, the organic phase washed with 3 N HCl (until washings were acidic), water and saturated sodium chloride solution. After drying ($MgSO_4$) the organic phase was evaporated in vacuo and the residue recrystallized twice from 350–400 ml ethanol. Yield 7.5 g (72 percent) of yellow solid: $\epsilon^{550} = 13.0 \times 10^4$ (3:1 dioxane-pH 6 buffer+excess $Ni^{2+}$).

Intermediates

Compound E, 8-[3-Chloro-5-(m-hydroxyphenylsulfamoyl)-2-pyridylazo]-5-quinolinol

A solution of 5.0 g (31.4 mmol) quinoline-5,8-quinone [T. Urbanski and S. Krzyzanowski, *Roczniki Chem.*, 27, 390 (1953); *Chem. Abstr.*, 49, 1041b (1955)] in 50 ml ethyl alcohol and 100 ml tetrahydrofuran was chilled to <5° C. Concentrated HCl (1 ml) and a cold slurry of 10.0 g (31.8 mmol) 3-chloro-5-(m-hydroxyphenylsulfamoyl)-7-pyridylhydrazine in 100 ml ethyl alcohol/0.5 ml concentrated HCl were added in that order. The reaction was stirred at 0°–10° C. for 18 hours. The crude product was collected by filtration and dried to yield 5.8 g of an orange solid. Concentration of the filtrates afforded an additional 2.6 g of less pure material. The crude product was purified by recrystallization from CH₃CN to yield 6.1 g (43 percent) of a yellow-orange solid: $\epsilon^{550} = 6.6 \times 10^4$ (3:1 dioxane-pH 6 buffer+Ni²⁺).

EXAMPLE 4

Synthesis of Compound 14

N,N-Di-n-octadecyl-4-(2-hydrazino-3-chloro-5-pyridinesulfonamido)-1-hydroxy-2-naphthamide (4.56 g; 0.005 mole) (U.S. Ser. No. 282,613, Example 2), acetone (15 ml) and conc. hydrochloric acid (2 drops) were mixed and heated at boiling for a couple minutes. On cooling and scratching the hydrazone crystallized. More methanol was added (100 ml) and after cooling in ice the hydrazone was filtered, washed with a little methanol, and dried to give 3.37 g (70.7 percent) of the acetone hydrazone.

This hydrazone, benzoyl chloride (1.05 g; 0.0075 mole), triethylamine (0.81 g; 0.008 mole), and pyridine (50 ml) were stirred under nitrogen in a flask with a condenser at room temperature over the weekend. Evaporation of the pyridine gave a syrup which could not be made to crystallize upon treatment with aqueous methanol.

The above syrup, which probably comprised a mixture of benzoylated products was treated with warm methanol-ether containing some conc. hydrochloric acid for a few minutes. After cooling to room temperature and adding more ether if necessary to maintain solution, 5,8-quinolinequinone (0.56 g; 0.0035 mole) was added followed by an hour of stirring. The solution, which was now orange, was transferred to a flask and degassed by bubbling nitrogen through the stirring solution. Methanolic potassium hydroxide was then added until a deep magenta color was maintained. After stirring two hours or so at room temperature, hydrochloric acid was added until the magenta color was gone. The liquid was partially evaporated to remove ether, diluted with water, stirred an hour, and the gummy solid was filtered.

Since the crude product would not become crystalline, and its purity was unknown, it was dissolved in methanolic ether and treated with an excess of nickel acetate in methanol. After stirring 30 min. the solution was diluted with water and stirred for an hour allowing a small ether layer to evaporate. The product was filtered and allowed to dry. The crude product was dissolved in ether and filtered to remove excess nickel acetate and any other inorganic salts. The ether solution was diluted with a methanol/ethanol (1:1) mixture and stirred for an hour as the metallized product separated. It was filtered and air dried to give 1.8 g as a purple powder. The analytical data suggested that the product was a mixture of the 2:1 complex shown and the acetate of the 1:1 complex.

Calculated for the 2:1 complex: C, 67.7; H, 8.2; N, 7.8; Cl, 3.3; S, 3.0; Ni, 2.7;

Calculated for the 1:1 complex (acetate): C, 64.6; H, 7.8; N, 7.2; Cl, 3.0; S, 2.7; Ni, 5.0;

Found: C, 65.5; H, 8.2; N, 7.4; Cl, 2.4; S, 2.5; Ni, 3.4.

EXAMPLE 5

Photographic Test

A photographic element was prepared by coating the following layers in the order recited on a transparent poly(ethylene terephthalate) film support. Coverages are parenthetically given in g/m² unless otherwise stated.

(1) DRR layer of Compound 14 ($2.2 \times 10^{-4}$ moles/m²) in ½ its weight of diethyllauramide, potassium 5-s-octadecylhydroquinone-2-sulfonate (0.022) and a blocked developing agent 1-phenyl-2-pyrazolin-3-yl-N-methyl-N-[2-(N-methyl-trifuloroacetamidomethyl)-4-(p-sulfonamido)-phenyl]carbamate (0.54) in gelatin (2.8);

(2) Green-sensitized silver chloride emulsion (0.39) in deionized gelatin (0.86), 1-(m-acetamidophenyl-2-tetrazoline-5-thione (350 mg/mole Ag), and octadecylquinone (5 g/mole Ag); and (3) overcoat layer of 2,5-di-s-dodecylhydroquinone (0.32) in deionized gelatin (0.54).

A receiving element was prepared by coating a mordant layer of a mixture of poly(N-vinylimidazole) (1.6 g/m²) and gelatin (1.6 g/m²) coated over a gelatin layer (0.81 g/m²) containing nickel sulfate (0.11) on a polyethylene-coated paper support.

The photographic element was given a full exposure to $D_{max}$, then soaked for 15 seconds in an activator containing per liter of developer: 33.7 g potassium hydroxide, 2.0 g potassium bromide, 3.0 g 5-methylbenzotriazole, and 2.0 g 11-aminoundecanoic acid. The photographic element was then laminated to the receiver. The laminate was then cut into four pieces and placed on a constant temperature (24° C.) block. The four receiver pieces were peeled off after 1, 3, 5 and 10 minutes, each dried and the Status A density recorded. The access time, taken as the first of the strips to achieve a constant density on the receiver, was 5 min. at a green density of 0.75. When the receiver was irradiated for 28 days with a 6000 W Xenon arc lamp at 50 Klux through a Wratten 2B (ultraviolet) filter, the density loss was only 0.14.

The invention has been described in detail with particular reference to preferred embodiments thereof, but it will be understood that variations and modifications can be effected within the spirit and scope of the invention.

What is claimed is:

1. A coordination complex of a polyvalent metal ion and a nondiffusible compound capable of releasing at least one diffusible magenta dye moiety comprising a 4-(2-heterocyclylazo)phenol having a heterocyclic ring fused thereto, said compound having the formula:

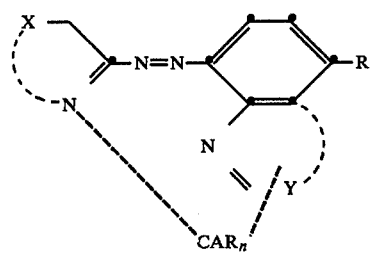

wherein:
(a) X represents the atoms necessary to complete a 5- or 6-membered heterocyclic ring;
(b) Y represents the atoms necessary to complete a 5- or 6-membered heterocyclic fused ring;
(c) CAR represents a ballasted carrier moiety capable of releasing said diffusible magenta dye moiety as a function of development of a silver halide emulsion layer under alkaline conditions;

(d) R represents a hydroxy group, a salt thereof, or a hydrolyzable precursor thereof, or CAR which is linked to said dye moiety through an oxygen atom thereon; and (e) n is 0, 1 or 2, with the proviso that when n is 0, then R is CAR which is linked to said dye moiety through an oxygen atom thereon.

2. The coordination complex of claim 1 which comprises a 2:1 complex of said nondiffusible compound and a divalent or trivalent hexacoordinate metal ion.

3. The coordination complex of claim 2 wherein said divalent or trivalent hexacoordinate metal ion is either zinc(II), nickel(II), copper(II), cobalt(II) or cobalt(III).

4. The coordination complex of claim 2 wherein said divalent or trivalent hexacoordinate metal ion is nickel-(II).

5. The coordination complex of claim 1 which comprises:

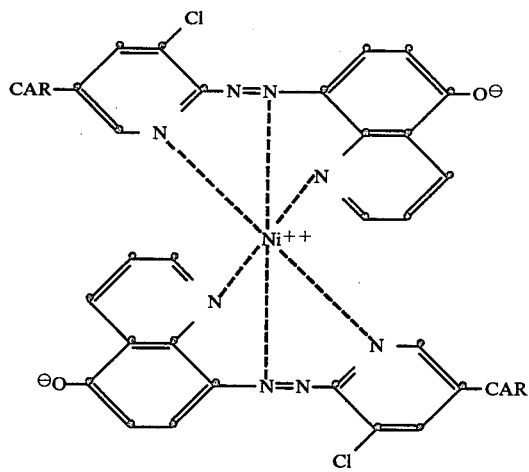

wherein CAR is

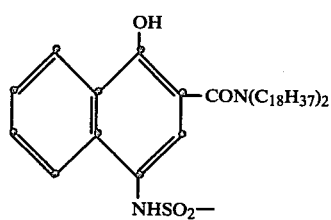

6. The coordination complex of claim 1 which comprises:

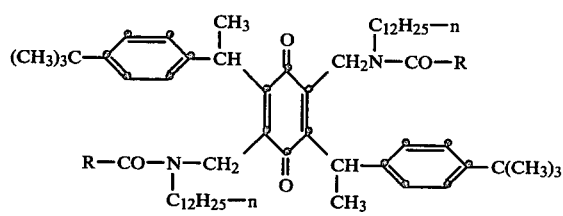

wherein R is

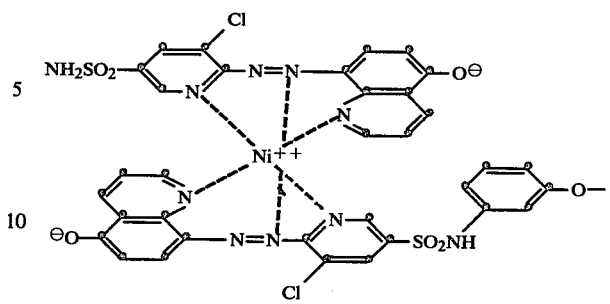

7. A photographic element comprising a support having thereon a coordination complex of a polyvalent metal ion and a compound having the formula:

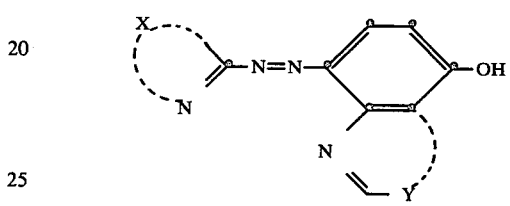

wherein:
(a) X represents the atoms necessary to complete a 5- or 6-membered heterocyclic ring, and
(b) Y represents the atoms necessary to complete a 5- or 6-membered fused ring.

8. The photographic element of claim 7 wherein X represents the atoms necessary to complete a pyridine ring and Y represents the atoms necessary to complete a quinoline ring.

9. The photographic element of claim 7 wherein the metal ion is nickel (II), copper (II), zinc (II), platinum (II), palladium (II), cobalt (II) or cobalt (III).

10. A coordination complex of a polyvalent metal ion and a compound having the formula:

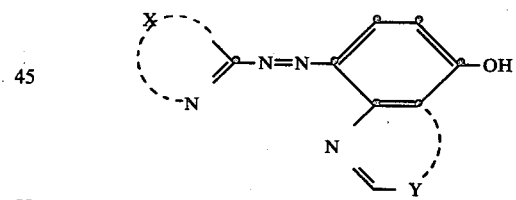

wherein:
(a) X represents the atoms necessary to complete a 5- or 6-membered heterocyclic ring, and
(b) Y represents the atoms necessary to complete a 5- or 6-membered heterocyclic fused ring.

11. The coordination complex of claim 10 wherein X represents the atoms necessary to complete a pyridine ring and Y represents the atoms necessary to complete a quinoline ring.

12. The coordination complex of claim 10 wherein the metal ion is nickel (II), copper (II), zinc (II), platinum (II), palladium (II), cobalt (II) or cobalt (III).

* * * * *